(12) United States Patent
Holmen et al.

(10) Patent No.: US 9,459,371 B1
(45) Date of Patent: Oct. 4, 2016

(54) RETRIEVABLE DOWNHOLE CABLE ANTENNA FOR AN ELECTROMAGNETIC SYSTEM

(71) Applicants: Garry Holmen, Arlington, TX (US); Keith Runnels, Cleburne, TX (US)

(72) Inventors: Garry Holmen, Arlington, TX (US); Keith Runnels, Cleburne, TX (US)

(73) Assignee: MULTI-SHOT, LLC, Conroe, TX (US)

( * ) Notice: Subject to any disclaimer, the term of this patent is extended or adjusted under 35 U.S.C. 154(b) by 0 days.

(21) Appl. No.: 14/335,706

(22) Filed: Jul. 18, 2014

Related U.S. Application Data

(60) Provisional application No. 61/980,848, filed on Apr. 17, 2014.

(51) Int. Cl.
*G01V 3/00* (2006.01)
*G01V 3/34* (2006.01)
*G01V 3/30* (2006.01)
*G01V 3/28* (2006.01)

(52) U.S. Cl.
CPC . *G01V 3/34* (2013.01); *G01V 3/30* (2013.01); *G01V 3/28* (2013.01)

(58) Field of Classification Search
CPC .................................................. G01V 3/30
See application file for complete search history.

(56) References Cited

U.S. PATENT DOCUMENTS

| | | | |
|---|---|---|---|
| 2,225,668 A | 12/1940 | Subkow et al. | |
| 2,653,220 A | 9/1953 | Bays | |
| 2,989,621 A | 6/1961 | Barton et al. | |
| 2,992,325 A | 7/1961 | Lehan | |
| 3,333,239 A | 7/1967 | Silverman | |
| 3,495,209 A | 2/1970 | Engle | |
| 3,590,141 A * | 6/1971 | Mildner | H01B 11/1869 174/105 R |
| 3,967,201 A | 6/1976 | Rorden | |
| 6,163,155 A | 12/2000 | Bittar | |
| 7,098,858 B2 | 8/2006 | Bittar et al. | |
| 7,520,334 B2 * | 4/2009 | Dallas | E21B 33/068 166/383 |
| 8,120,509 B2 | 2/2012 | Young | |
| 8,400,326 B2 | 3/2013 | Codazzi | |
| 9,110,099 B2 | 8/2015 | Homan et al. | |
| 2011/0017512 A1 * | 1/2011 | Codazzi | E21B 47/122 175/40 |

(Continued)

FOREIGN PATENT DOCUMENTS

WO 2011049573 4/2011

OTHER PUBLICATIONS

SureShot EM Telemetry System Technical Data Sheet, Rev. 160127-vB.01, APS Technology, Inc. 2016, 2 pages.

(Continued)

*Primary Examiner* — Reena Aurora
(74) *Attorney, Agent, or Firm* — Jackson Walker L.L.P.

(57) ABSTRACT

This invention provides an improved system and method for receiving electromagnetic (EM) signals from a wellbore in spite of EM unfriendly formations by placing a cable antenna in a wellbore, drilling another wellbore nearby, and using the cable antenna downhole in the wellbore to assist in receiving signal from the transmitter in the wellbore being drilled. The EM telemetry system can include a bottom hole assembly with an EM tool for transmitting a signal positioned in a first wellbore; EM equipment provided at or near the surface; and a cable antenna coupled to the EM analyzer positioned in a second wellbore. The cable antenna does not require other downhole antenna devices for receiving EM signals and therefore is independent of other antenna devices. The cable antenna can be retrieved after drilling is completed and moved to another drilling site.

21 Claims, 5 Drawing Sheets

(56) References Cited

U.S. PATENT DOCUMENTS

2011/0074428 A1    3/2011   Wang
2013/0141104 A1    6/2013   Homan et al.

OTHER PUBLICATIONS

Sheen, Shuh-Haw, Waveguide-based Ultrasonic and Far-field Electromagnetic Sensors for Downhole Reservoir Characterization, Geothermal Technologies Program 2010 Peer Review, U.S. Department of Energy, May 19, 2010, 14 pages.
Sheen, Shuh-Haw et al., Waveguide-based Ultrasonic and Far-field Electromagnetic Sensors for Downhole Reservoir Characterization, Argonne National Laboratory, Nuclear Engineering Division, Oct. 2010, 39 pages.
Wang, K. et al., Ultrasonic and Electromagnetic Sensors for Downhole Reservoir Characterization, Proceedings, Thirty-Sixth Workshop on Geothermal Reservoir Engineering, Stanford University, Stanford, California, Jan. 31-Feb. 2, 2011, 7 pages.
Wei, Yingkang, Propagation of Electromagnetic Signal along a Metal Well in an Inhomogeneous Medium, Thesis for the degree of Philosophiae Doctor, Norwegian University of Science and Technology, Trondheim, Jan. 2013, 147 pages.
Measurement while drilling, https://en.wikipedia.org/wiki/Measurement_while_drilling, retrieved Mar. 17, 2016, 6 pages.
Email and resume from Garry Holmen, Apr. 8, 2016, 7 pages.
Iskander, M.F., et al., A New Electromagnetic Propagation Tool for Well Logging, SPE Annual Technical Conference and Exhibition, Sep. 16-19, 1994, Houston, Texas, Society of Petroleum Engineers, Abstract, 2 pages.
Wharton, Russel P. et al., Advancements in Electromagnetic Propagation Logging, SPE Rocky Mountain Regional Meeting, May 14-16, 1980, Casper, Wyoming, Society of Petroleum Engineers, Abstract, 2 pages.
Project Facts, Crosswell Electromagnetic Logging Tool, U.S. Department of Energy, Office of Fossil Energy, National Energy Technology Laboratory, Strategic Center for National Gass and Oil, Feb. 2004, 2 pages.
OnePetro Search Results for "downhole electromagnetic antenna" published between 2014 and 2015, retrieved Mar. 30, 2016, 15 pages.
OnePetro Search Results for "electromagnetic antenna", retrieved Mar. 30, 2016, 30 pages.
OnePetro Search Results for "electromagnetic antenna" published between 2014 and 2015, retrieved Mar. 30, 2016, 32 pages.
Calvert, Thomas J. et al., Electromagnetic Propagation . . . A New Dimension in Logging, SPE California Regional Meeting, Apr. 13-15, 1077, Bakersfield, California, Society of Petroleum Engineers, Abstract, 2 pages.
Clark, Brian et al., Electromagnetic Propagation Logging While Drilling: Theory and Experiment, SPE Formation Evaluation, vol. 5, Issue 3, Sep. 1990, Society of Petroleum Engineers, Summary, 2 pages.
Rodney, Paul F., Electromagnetic Wave Resistivity MWD Tool, SPE Drilling Engineering, vol. 1, Issue 5, Oct. 1986 Society of Petroleum Engineers, Summary, 2 pages.
Marsala, Alberto Francesco et al., Evaluation of Borehole Casing Sources for Electromagnetic Imaging of Deep Formations, International Petroleum Technology Conference, Dec. 10-12, 2014, Kuala Lumpur, Malaysia, Abstract, 2 pages.
Sinker Bars / Eccentered Weights, Hunting Energy Services, www.hunting-intl.com/titan/wireline-hardware-and-accessories/s . . . , retrieved Apr. 6, 2016, 1 pages.
Rassenfoss, Stephen, Electromagnetic Imaging Offers First Look at the Propped Rock, Journal of Petroleum Technology, Article 10789, retrieved Mar. 30, 2016, 13 pages.
Chen, Jiefu et al., Long Range Electromagnetic Telemetry Using an Innovative Casing Antenna System, Society of Petroleum Engineers, 2015, 10 pages.
Bennetzen, Martin Vad et al., Novel Applications of Nanoparticles for Future Enhanced Oil Recovery, International Petroleum Technology Conference, Dec. 10-12, 2014, Kuala Lumpur, Malaysia, Abstract, 2 pages.
Gao, Guozhong, Novel Processing of Electromagnetic Logging Measurements through metallic Casing, SPE Annual Technical Conference and Exhibition, Oct. 27-29, 2014, Amsterdam, The Netherlands, Society of Petroleum Engineers, Abstract, 2 pages.
Reisz, A.C. et al., Reservoir Monitoring with Interwell Electromagnetic Imaging, SPWLA 40th Annual Logging Symposium, May 30-Jun. 3, 1999, Oslo, Norway, Society of Petrophysicists and Well-Log Analysts, Abstract, 2 pages.
Sinker Bars/Eccentered Weights, Specifications, Hunting Titan, Hunting Energy Services, 2012, 5 pages.
Huchital, G.S., The Deep Propagation Tool (A New Electromagnetic Logging Tool), SPE Annual Technical Conference and Exhibition, Sep. 26-29, 1982, New Orleans, Louisiana, Society of Petroleum Engineers, Abstract, 2 pages.
De, Bibhas R. et al., Ultrabroadband Electromagnetic Well Logging: A Potential Future Technology, SPWLA 33rd Annual Logging Symposium, Jun. 14-17, 1992, Oklahoma City, Oklahoma, Society of Petrophysicists and Well-Log Analysts, Abstract, 1 page.
Hunter, J. et al., Unique Application of EM LWD Casing Antenna System to Rocky Mountain Drilling, SPE Western North American and Rocky Mountain Joint Meeting, Apr. 17-18, 2014, Denver, Colorado, 8 pages.
Rodriguez, Ali, Working with the Magic of Electromagnetics, Reprinted from Oilfield Technology Mar. 2014, 3 pages.
Wie, Yingkang et al., Wave Propagation along a Thin Wire Antenna Placed in a Horizontally Layered Medium, IEEE 2010, 1 page.
Hoversten, G.M. et al., Reservoir characterization using crosswell electromagnetic inversion: A feasibility study for the Snorre field, North Sea, Society of Exploration Geophysicists, Geophysics, vol. 66, No. 4 (Jul.-Aug. 1001); p. 1177-1189.
Weatherford, From Data to Decisions, 2014, 1 page.
Balance Point, 1 page.

* cited by examiner

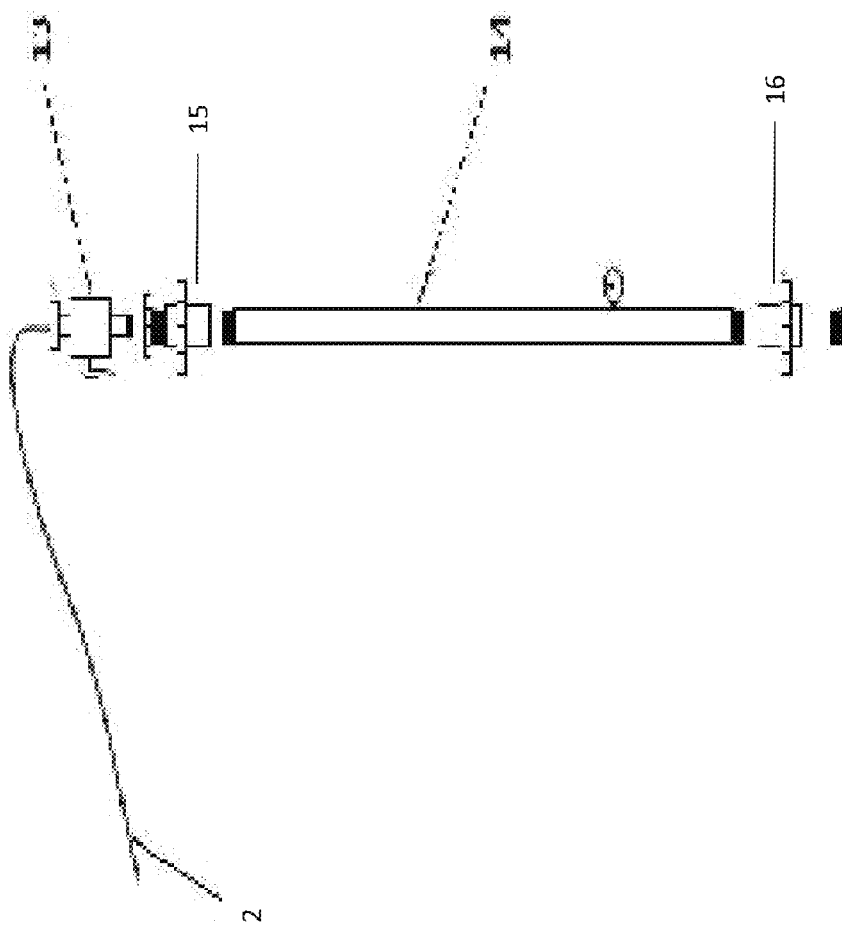

RETRIEVABLE DOWNHOLE CABLE ANTENNA FOR AN ELECTROMAGNETIC SYSTEM

CROSS REFERENCE TO RELATED APPLICATIONS

This application claims the benefit of U.S. Provisional Application No. 61/980,848, filed Apr. 17, 2014, which is incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

This invention relates to a retrievable downhole cable antenna for an electromagnetic EM system, and more specifically, to providing improved signal reception with such an antenna situated in a wellbore near drilling operations.

Modern drilling techniques employ sensors downhole and broadcast this sensor information to surface using Measurement While Drilling (MWD) telemetry. Currently there are four different varieties of MWD telemetry: mudpulse, electromagnetic (EM), acoustic, and wired drill pipe:
  Mudpulse—the data is encoded in pressure waves encapsulated within the drilling medium itself;
  Electromagnetic (EM)—the data is sent to the surface using low frequency electromagnetic waves generated by producing a voltage across an insulating gap in the drill string;
  Acoustic—where data is transmitted along the drill pipe to surface using acoustic waves; and
  Wired Drill Pipe—where data is transmitted along special drill pipe that is wired to support high data rates.

Electromagnetic (EM) telemetry requires pushing an EM signal into the formation surrounding a downhole transmitter and receiving that signal through this formation at the surface. This transmission through the formation makes the formation a large contributor to whether an EM system works or not in a geographical area. If the formations are "EM friendly," the signal can be received at the surface and decoded. If the formations are "EM unfriendly," such as salt layers and other layers, then the formations either limit signal output from the transmitter or attenuate/reduce the signal as it passes through formations to the surface. Usually, the deeper the well is drilled, the more layers of formation are drilled through and the more difficult it is for an EM signal to reach the surface from the transmitter. This attenuation/reduction of the signal can result in limited EM applications in those geographical areas or depths. Further discussion of electromagnetic telemetry can be found in U.S. Pat. No. 8,120,509 to Allen Richard Young, which is fully incorporated herein by reference.

In EM applications, a carrier signal is produced by applying an alternating voltage across an electrical isolation in the drill pipe. This application of a voltage across the electrical isolation can be referred to as a "Gap Sub." An example of a Gap Sub is provided in PCT/US2009/061678, which is incorporated herein by reference. This EM carrier signal can be received on surface with antennas and decoded as EM telemetry.

A significant limiting factor in successfully using EM for MWD telemetry is that the EM signal must pass through all the formations drilled through, and must push enough signal into formation that is being currently drilled to receivers at the surface. If formations are highly resistive, then only limited power can be created as an EM signal. If the formations are low resistance, then the signal can quickly be drawn into that formation and disappear.

Typically, EM antennas are placed on the surface and moved around to find the best signal reception, while avoiding noise generators such as electric motors on rigs, power conductors, etc. As the well is drilled deeper, the more formations the signal must pass through, and typically, the signal that reaches these surface antennas is weaker or may not even reach the surface antennas. Others have attempted improving EM telemetry by placing antenna(s) deeper in the well either by using a cable integrated within casing or by placing a secondary receiver higher in the same wellbore or a secondary receiver in an alternate wellbore to repeat/transmit the signal to surface. An example of a secondary received in an alternate wellbore is described in U.S. Pat. No. 8,400,326 to Daniel Codazzi, which is fully incorporated herein by reference. However, even this system requires the use of a secondary receiver separate from a cable to transmit the EM signals to surface.

Thus, there remains a need for a system and method for receiving EM signals from a wellbore in spite of EM unfriendly formations in a simplified manner.

SUMMARY OF THE INVENTION

This invention provides an improved system and method for receiving electromagnetic (EM) signals from a wellbore in spite of EM unfriendly formations by placing a cable antenna in a wellbore, drilling another wellbore nearby, and using the cable antenna downhole in the wellbore to assist in receiving signal from the transmitter in the wellbore currently being drilled. The EM telemetry system can include a bottom hole assembly with an EM tool for transmitting a signal positioned in a first wellbore; EM equipment provided at or near the surface; and a cable antenna coupled to the EM analyzer positioned in a second wellbore. The cable antenna does not require other downhole antenna devices for receiving EM signals and therefore is independent of other antenna devices. The cable antenna can be retrieved after drilling is completed and moved to another drilling site. This retrievability reduces costs, increases re-use, and does not require downhole devices in the secondary/receiving wellbore.

In at least one embodiment of the invention, an electromagnetic (EM) telemetry system can utilize a downhole tool with an EM tool positioned in a first wellbore that is capable of generating a carrier EM signal. The system can also include a cable antenna with a first end positioned in a second wellbore and a second end extending to the surface of the second wellbore, wherein the cable antenna is capable of receiving the signal from the EM tool through a formation. In some embodiments, the second end of the cable antenna can be optionally coupled to EM analyzer. In some embodiments, the cable antenna can be insulated. In some embodiments, the cable antenna weighted. For example, a weight bar can be coupled to the first end of the cable antenna. The cable antenna is retrievable and/or reusable.

In some embodiments, a wireline truck is outfitted with the cable antenna. In some embodiments, the cable antenna can optionally be threaded through a normal wireline weight bar to allow easy deployment and retrievability with wireline equipment. The wireline is then deployed in the initial well to a desired depth (e.g. as a nonlimiting example, a lowest depth in the well) at which point the cable antenna can be resting against the formation at that depth. An EM tool capable of generating a signal can be positioned in another well near the initial well. The cable antenna is connected at the surface through the wireline termination to the antenna inputs of the EM analyzer as an input source. Upon completion of drilling the weight bar/wireline cable antenna is retrieved back to surface for a future deployment.

In another embodiment, a crane, service rig or another drilling rig could be used to deploy the antenna through its cabling/tugger line systems. Numerous other methods of deploying and retrieving the cable antenna are possible in other embodiments.

The disclosure describes an electromagnetic (EM) telemetry system comprising: an EM tool deployed in a first wellbore and configured to transmit EM signals from the first wellbore; and a cable antenna deployed in a second wellbore and configured as an antenna to receive signals from the EM tool independent of other receiver devices and communicate the signals to an EM analyzer to analyze the signals.

The disclosure also describes a method of receiving electromagnetic (EM) telemetry signals, comprising: transmitting EM signals from an EM tool deployed in a first wellbore; receiving the EM signals into a cable antenna deployed in a second wellbore as an antenna independently of other receiver devices; and providing the EM signals through the cable antenna to an EM analyzer.

The foregoing has outlined rather broadly various features of the present disclosure in order that the detailed description that follows can be better understood. Additional features and advantages of the disclosure will be described hereinafter.

BRIEF DESCRIPTION OF THE DRAWINGS

FIG. 3 is an illustrative embodiment of a wellhead hardware that the antenna might thread through at surface.

DETAILED DESCRIPTION

Figure 1:
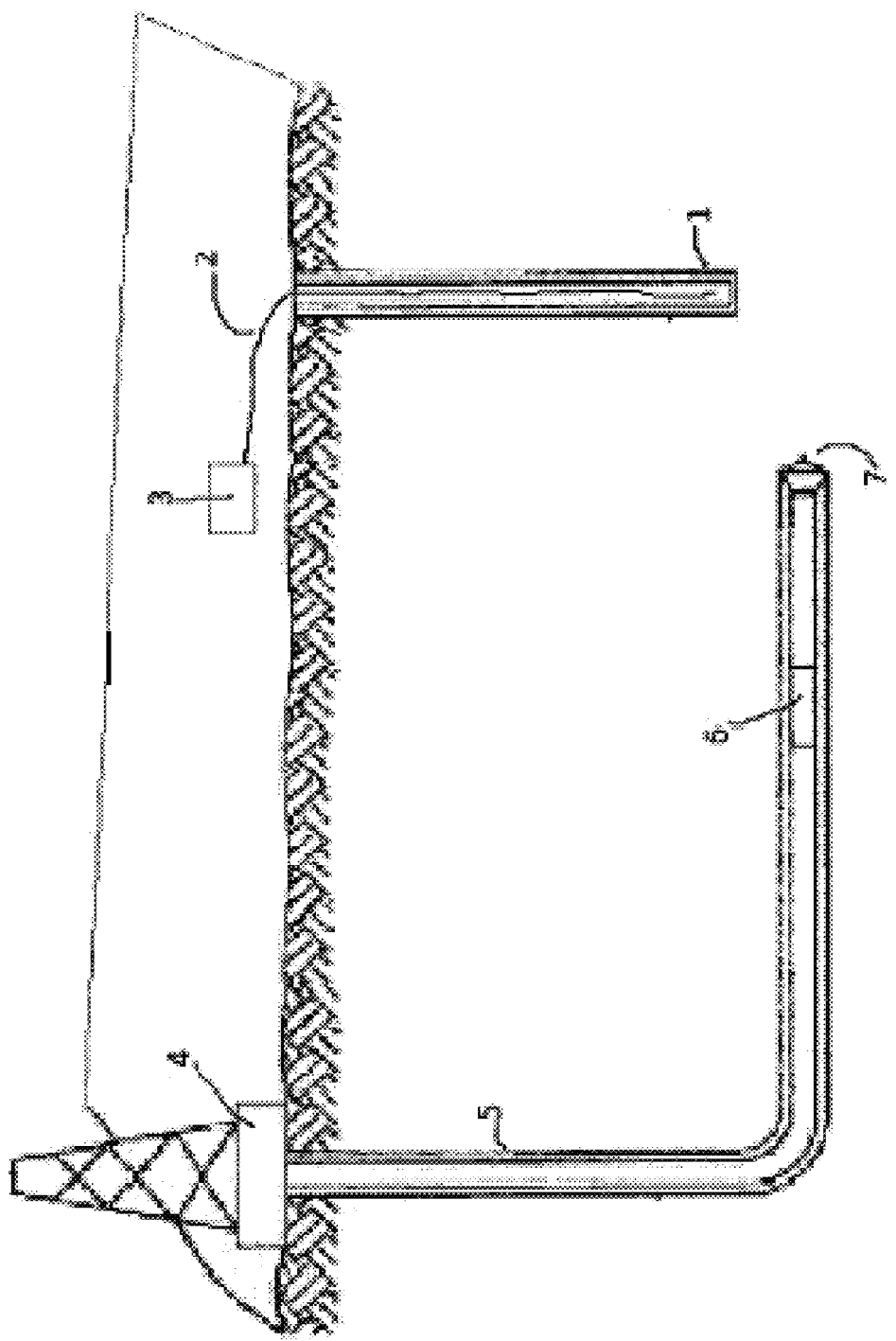
FIG. 1 is an illustrative embodiment of an EM telemetry system with a retrievable cable antenna.

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous embodiment-specific decisions to achieve the developer's ultimate goal for the commercial embodiment. Such embodiment-specific decisions may include, and likely are not limited to, compliance with system-related, business-related, government-related and other constraints, which may vary by specific embodiment, location and from time to time. While a developer's efforts might be complex and time-consuming in an absolute sense, such efforts would be, nevertheless, a routine undertaking for those of ordinary skill in this art having benefit of this disclosure. It must be understood that the invention disclosed and taught herein is susceptible to numerous and various modifications and alternative forms. It is understood that the various embodiments of the invention, although different, are not mutually exclusive. For example, a particular, feature, structure, or characteristic described herein in connection with one embodiment can be implemented within other embodiments without departing from the spirit and scope of the invention. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. In addition, it is understood that the location or arrangement of individual elements within each disclosed embodiment can be modified without departing from the spirit and scope of the invention. The following detailed description is, therefore, not to be taken in a limiting sense, and the scope of the present invention is defined only by the appended claims, appropriately interpreted, along with a full range of equivalents to which the claims are entitled. In the drawings, like numerals refer to the same or similar functionality throughout the several views. Where appropriate, one or more elements may have been labeled with an "A" or "B" to designate various members of a given class of an element. When referring generally to such elements, the number without the letter can be used. Further, such designations do not limit the number of members that can be used for that function.

This invention provides an improved system and method for receiving electromagnetic (EM) signals from a wellbore in spite of EM unfriendly formations by placing a cable antenna in a wellbore, drilling another wellbore nearby, and using the cable antenna downhole in the wellbore to assist in receiving signal from the transmitter in the wellbore being drilled. The EM telemetry system can include a bottom hole assembly with an EM tool for transmitting a signal positioned in a first wellbore; EM equipment provided at or near the surface; and a cable antenna coupled to the EM analyzer positioned in a second wellbore. The cable antenna does not require other downhole antenna devices for receiving EM signals and therefore is independent of other antenna devices. The cable antenna can be retrieved after drilling is completed and moved to another drilling site. This retrievability reduces costs, increases re-use, and does not require downhole devices in the secondary/receiving wellbore.

FIG. 1 is an illustrative embodiment of an electromagnetic (EM) telemetry system with a retrievable cable antenna. In electromagnetic telemetry, the earth can function as a medium for transmitting electromagnetic wave signals, and thus carrying information through the formation. A drilling rig 4 can use a drill string of tubular products coupled to a drill bit 7 for penetrating through earth formations to create a wellbore 5 in a formation. In operation, weight applied through the drill collars to the drill bit permits the drill bit to cut as it rotates and make cuttings in the underground formations.

An illustrative EM telemetry system can include a bottom hole assembly (BHA). A BHA can include an EM tool 6 that is capable of transmitting EM signals through the formation to a receiver. The BHA can include sensors and/or a processor to determine downhole conditions and process this data. The sensors can be selected and adapted as required for the particular drilling operation, to measure downhole parameters such as, but not limited to, downhole pressure, temperature, resistivity or conductivity of the drilling mud or earth formations, density and porosity of the earth formations, and other downhole conditions.

In contrast to other EM systems, the invention can utilize a cable antenna 2, independently of receiver(s) provided at the surface, or even receiver(s) located downhole in a wellbore 1, so that such receiver(s) are not required for the EM system disclosed herein to operate. As shown, the wellbore 1 is separated from well 5. The EM tool 6 from the wellbore 5 can transmit sensor data of the downhole conditions to the cable antenna 2. The transmission can occur at depths that may be higher or lower than EM unfriendly formations and thus the cable antenna 2 in the wellbore 1 can receive EM signals from the EM tool 6 in the wellbore 5.

In at least one embodiment, the cable antenna 2 can only be a cable and does not require coupling or attachment to receivers, electrodes, sensors, magnetometers, fiber optic devices, or the like. The cable antenna can be insulated or uninsulated along at least portions of the cable. In some embodiments, the cable antenna 2 can at least partially insulated, such as and without limitation insulated within the wellbore 1.

Figure 1A:
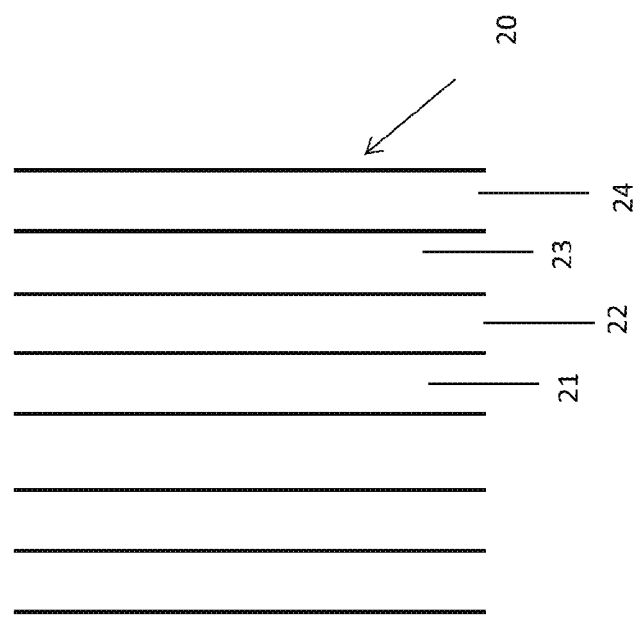
FIG. 1A illustrates an embodiment of an insulated, shielded EM cable antenna.

FIG. 1A illustrates an embodiment of an insulated, shielded EM cable antenna. The cable antenna 2 can be electromagnetically shielded to prevent EM signal loss to formations or other conductors above in the wellbore. For example, a shielded portion 20 of the cable antenna 2 can provide a core 21; a dielectric insulator 22 surrounding the core; an EM shield layer 23 of conductive or magnetic material over the dielectric insulator, and a jacket 24 surrounding the shield layer. The EM shielding allows insulated the cable antenna 2 to be utilized in deep wells while still shielding the cable antenna from formations and conductors higher in the wellbore that could steal signal strength or contaminate the signal with noise. Rather than utilizing a separate device, such as a separate receiver to receive a signal, the cable antenna itself acts as a receiver. More or less layers or shielding are possible in other embodiments.

The cable antenna 2 allows for easy deployment with any suitable cable antenna deployment systems. In some embodiments, the cable antenna 2 can be deployed using standard wireline or slickline equipment. In other embodiments, a service rig or another drilling rig with cabling/tugger line systems can be utilized to deploy cable antenna 2. The initial wellbore 1 can be cased or uncased.

Further, the cable antenna 2 is retrievable from a wellbore and can be redeployed into another wellbore, thereby making it reusable. This retrievability is in contrast to some systems which generally leave a receiver in a wellbore.

Generally, the cable antenna 2 will communicate with an EM analyzer 3. The communication can occur by a wired or wireless communication. The EM analyzer 3 generally includes a processor that can decode this received sensor data. EM analyzer 3 can provide decoding, processing, storage, and/or the like of received EM data. In at least one embodiment, the EM analyzer 3 is utilized only for signals, such as receiving signals or transmitting signals. In such embodiments, the EM analyzer 3 does not need to send power downhole. In some embodiments, EM analyzer 3 may not be present at the location. The EM analyzer can be mounted at or near the surface for practical considerations of access, although such locations are not limiting. For example, the cable antenna 2 could communicate the EM signals to a repeater or other transmitter for then forwarding to a remotely located EM analyzer 3.

Still further, the representation of a wellbore 1 and a wellbore 5 herein can represent a vertical portion of a wellbore 1 with a wellbore 5 that is adjacently drilled near the vertical wellbore 1, where the adjacent wellbore is considered separate for purposes herein. The EM tool 6 can transmit the EM signals from the wellbore 5, to the cable antenna 2 in the vertical wellbore that can in turn communicate with the EM analyzer 3. Thus, in keeping with the purposes described herein, the transmission from the adjacent wellbore 5 to the cable antenna 2 in the wellbore 1 avoids the difficulties of transmitting through EM unfriendly formations to surface.

Figure 2:
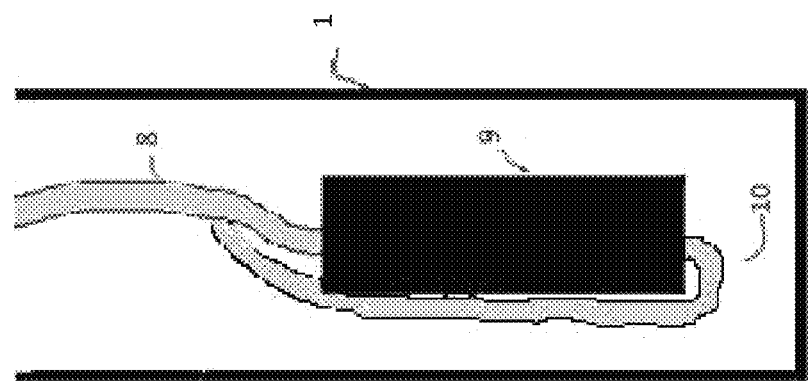
FIG. 2 is an illustrative embodiment of a downhole portion of a cable antenna with wireline weight bar attached.

FIG. 2 is an illustrative embodiment of a downhole portion 8 of a cable antenna 2 with a weight bar 9 attached is shown in the well 1. The weight bar 9 is preferably heavy to aid deployment. The weight bar 9 can be made of any suitable material, such as, but not limited to, non-conductive material, as an insulator, or conductive material. In some embodiments, the weight bar 9 can be formed from a conductive, non-corrosive material so that it is not damaged by well conditions. In some embodiments, the weight bar is insulated from the core of the cable.

In some embodiments, a downhole portion 8 of the cable antenna 2 is not insulated by an insulator or shielding layer, thereby leaving an exposed portion 10 of the core. The length of an exposed portion 10 can be any suitable length and, in some embodiments, the length can be equal to or between approximately 1 foot to 60 feet. The cable antenna, well profile, and the use of the weight bar 9 can all influence the length of exposure. The downhole portion 8 can be threaded through a weight bar 9, such as a wireline weight bar. To change reception in the wellbore 1, an exposed downhole portion 8 can be threaded through the wireline weight bar 9 to change contact with the formation of the wellbore 1. The exposed portion 10 can be coupled to the downhole portion 8 above the weight bar 9, wrapped around the weight bar 9, or left loose to contact the wellbore 1.

FIG. 3 is an illustrative embodiment of a wellhead hardware that the cable antenna 2 might thread through at surface. The cable antenna 2 slides past a wireline lock nut assembly 13 that can locked to prevent further unwanted cable deployment into the well head. Once the cable antenna 2 is past the upper hammer union 15 the weight bar 5 is attached and threaded through a well head lubricator assembly 14. This lubricator assembly 14 allows the antenna 2 and weight bar 5 to be fully retrieved inside of it and locked out in the event of any pressure event on the well head. The lubricator 14 is attached via a crane to the well head with a lower hammer union and a well head flange 17. This allows the antenna 2 and weight bar 5 to fully deployable and retrievable in adverse pressure conditions.

Figure 4:
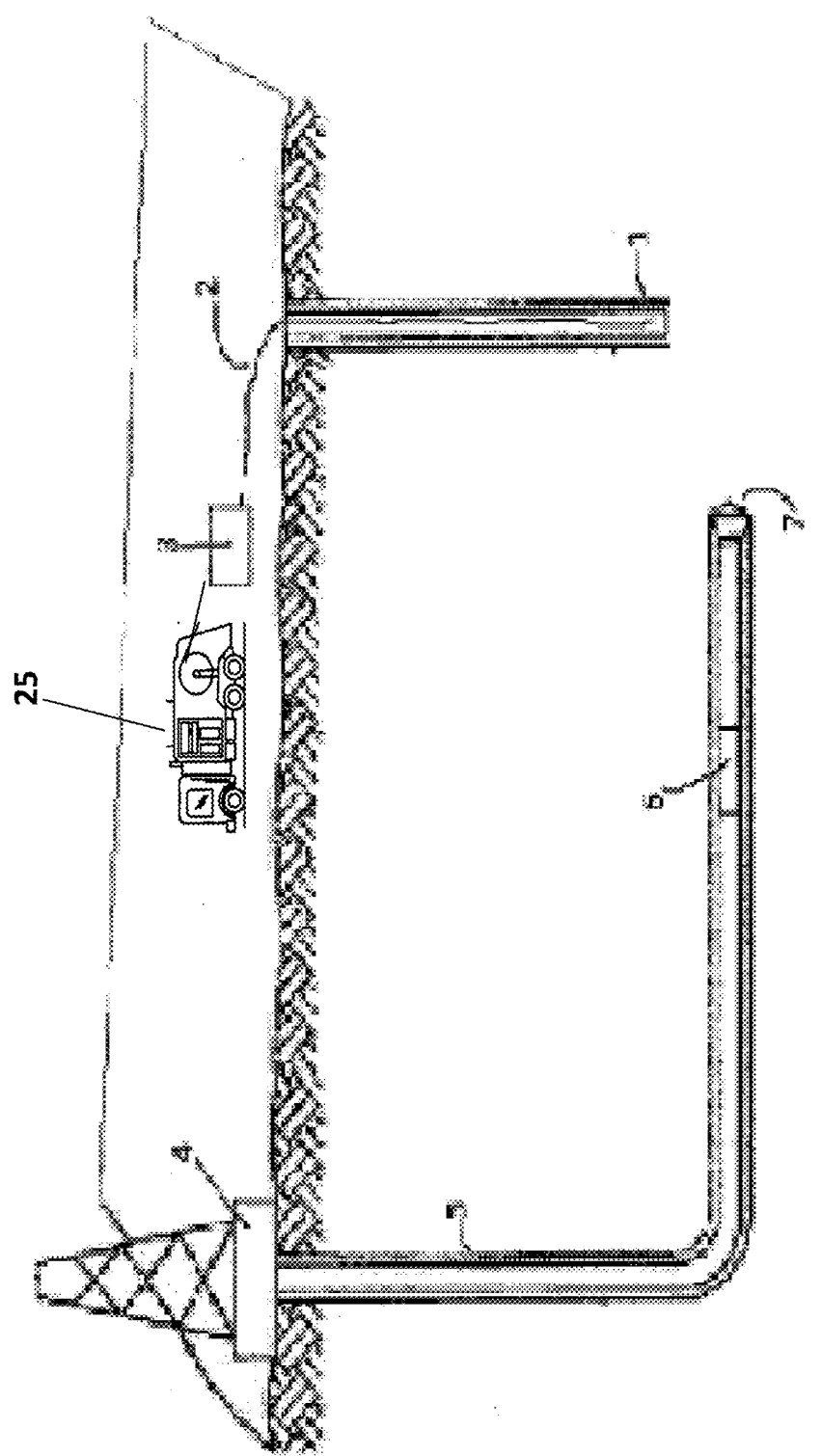
FIG. 4 is an illustrative embodiment of a wireline truck and connections thereof.

FIG. 4 is an illustrative embodiment of a wireline truck and connections thereof. A wireline truck 25 can be used to deploy and retrieve the cable antenna 2 into and from the wellbore 1. The EM analyzer 3 can be in communication with the cable antenna 2. For example, after deployment, the EM analyzer can be coupled to the cable antenna and then decoupled after services are completed. If a wireline truck 25 is attached to the cable for deployment/irretrievability a user can still monitor signal strength during operations by attaching the EM surface equipment 3 to the pick-up head of the wireline truck 25. Signal could be monitored for the optimal antenna placing if needed.

Figure 5:
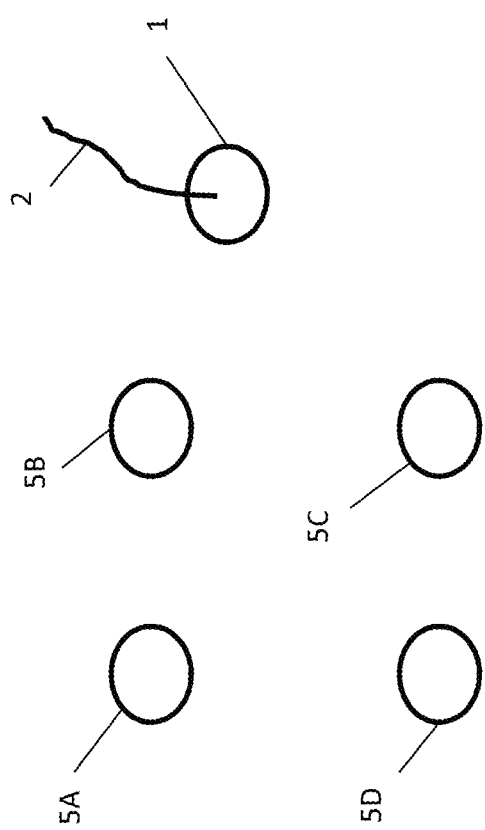
FIG. 5 is an illustrative embodiment of multiple transmitting EM tools for transmitting signals from one or more first wellbores to one or more of the cable antennas in a second wellbore.

FIG. 5 is an illustrative embodiment of multiple transmitting EM tools for transmitting signals from one or more first wellbores to one or more of the cable antennas in a second wellbore. The cable antenna 2 in wellbore 1 can be used to receive signals from multiple wellbores, such as wellbores 5A, 5B, 5C and 5D. The illustrated multiple wellbores can represent, without limitation, multiple wellbores on a drilling pad, multiple wellbores from multiple drilling pads, or multiple wellbores drilled horizontally from a single vertical wellbore.

In operation of an exemplary embodiment, In the preferred embodiment of the invention the following process is followed:

The cable antenna 2 can be lowered into a wellbore 1 near a wellbore 5 that is subject to being drilled. The wellbore 1 can be cased or uncased. The cable antenna 2 can be coupled or otherwise in communication from below surface back to the EM analyzer 3 for analyzing purposes. The wellbore 5 can be drilled, for example, by using a drilling rig 4, a drill bit 7 and a drilling BHA that includes a transmitting EM tool 6. The EM tool 6 in the wellbore 5 can transmit a signal into the formation surrounding the wellbore 5. As a nonlimiting example, the EM tool 6 can transmit a carrier signal by applying an alternating voltage across an electrical isolation in the drill pipe or gap sub. The signal transmitted by EM tool 6 is received by cable antenna 2 and coupled to surface or near the surface (such as above an EM unfriendly formation) through the cable antenna, so that the signal is not lost into the formation. Upon completion of drilling of the wellbore 5 (or pad of wells), the cable antenna 2 can be retrieved back to surface, in contrast to other EM systems. Further, the wellbore 1 and associated well can be put into production if desired.

This design has at least the following advantages over existing designs:

Ease of deployment: This system can utilize standard drilling equipment and practices found extensively in the field. For example, the cable antenna could be deployed using standard wireline or slickline equipment. In other embodiments, a service rig or another drilling rig could be used to deploy the antenna through their cabling/tugger line systems. Further, numerous other methods of deploying the cable antenna are possible in other embodiments. Instead of using surface receivers, modifying well casing or deploying multiple receivers downhole like other EM systems, a straightforward cable antenna is deployed.

Retrievability: Many other EM systems leave some EM equipment, such as receivers, electrodes, sensors, or the like, downhole once drilling is complete. This increases costs of the drilling operation and can impact how those wells can be placed into production. With this system, the cable antenna is removed and can be reused in another drilling operation.

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

Other and further embodiments utilizing one or more aspects of the invention described above can be devised without departing from the spirit of Applicant's invention. For example, the wellbores can be drilled with equipment other than the drilling rig illustrated, the wellbores can vary in relative depth and angle from the illustrations, the EM analyzer can be local or remote and directly connected to the antenna cable or indirectly through wireless communications or other equipment, the downhole portion of the antenna cable can be insulated throughout its length in the wellbore, and other variations in keeping with the goals and advantages described herein.

Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system can be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. An electromagnetic telemetry system comprising:
    an electromagnetic tool deployed in a first wellbore and configured to transmit EM signals from the first wellbore;
    a cable deployed in a second wellbore and configured as an antenna to receive said electromagnetic signals from the electromagnetic tool independent of receiver devices attached to the cable antenna and couple the electromagnetic signals to an electromagnetic analyzer to analyze the electromagnetic signals; and a weight bar coupled to the cable antenna, the weight bar being non-conductive to the cable antenna.

2. The electromagnetic telemetry system of claim 1, wherein the cable antenna is removable from the second wellbore.

3. The electromagnetic telemetry system of claim 1, wherein the cable antenna is deployed from a wireline system.

4. The electromagnetic telemetry system of claim 1, further comprising:
    an insulation disposed between the weight bar and the cable antenna.

5. The electromagnetic telemetry system of claim 1, wherein the weight bar comprises non-conductive material.

6. The electromagnetic telemetry system of claim 1, wherein the weight bar comprises conductive material.

7. A plurality of electromagnetic telemetry systems as described in claim 1, where signals from one or more transmitting electromagnetic tools are received by one or more of the cable antennas.

8. The electromagnetic telemetry system of claim 1, wherein the cable antenna is insulated within the second wellbore.

9. The electromagnetic telemetry system of claim 8, wherein the insulated cable antenna comprises:
    a core;
    a dielectric insulator surrounding the core; and
    a shield layer of conductive or magnetic material over the dielectric insulator.

10. The electromagnetic telemetry system of claim 1, wherein the cable antenna or portion of thereof is uninsulated.

11. The electromagnetic telemetry system of claim 1, wherein the cable antenna or portion of thereof is insulated.

12. The electromagnetic telemetry system of claim 1, further comprising wellhead equipment for guiding the cable antenna into the second wellbore, comprising:
    a wireline lock nut assembly; and
    a wellhead lubricator assembly.

13. A method of receiving electromagnetic telemetry signals, comprising:
    transmitting electromagnetic signals from an electromagnetic tool deployed in a first wellbore;
    receiving the electromagnetic signals into a cable deployed in a second wellbore as an antenna independent of receiver devices attached to the cable antenna; the cable antenna having a weight bar coupled to the cable antenna, the weight bar being non-conductive to the cable antenna; and; and
    providing the electromagnetic signals through the cable antenna to an electromagnetic analyzer.

14. The method of claim 13, further comprising retrieving the cable antenna from the second wellbore.

15. The method of claim 13, further comprising deploying the cable antenna using a wireline system.

16. The method of claim 13, further comprising an insulation disposed between the weight bar and the cable antenna into the second wellbore.

17. The method of claim 13, further comprising inserting the cable antenna for deployment into the second wellbore through a wireline lock nut assembly and a wellhead lubricator assembly.

18. An electromagnetic (electromagnetic) telemetry system comprising:
    an electromagnetic tool deployed in a first wellbore and configured to transmit electromagnetic signals from the first wellbore; and
    a cable antenna deployed in a second wellbore and configured as an antenna to receive signals from the electromagnetic tool independent of other receiver devices and couple the signals to an electromagnetic analyzer to analyze the signals;
    a weight bar coupled to the cable antenna; and
    an insulation disposed between the weight bar and the cable antenna.

19. The electromagnetic telemetry system of claim 18, wherein the weight bar comprises non-conductive material.

20. The electromagnetic telemetry system of claim 18, wherein the weight bar comprises conductive material.

21. A method of receiving electromagnetic (electromagnetic) telemetry signals, comprising:
    transmitting electromagnetic signals from an electromagnetic tool deployed in a first wellbore;
    receiving the electromagnetic signals into a cable antenna deployed in a second wellbore as an antenna independently of other receiver devices, the cable antenna having a weight bar coupled to the cable antenna with an insulation disposed between the weight bar and the cable antenna; and
    providing the electromagnetic signals through the cable antenna to an electromagnetic analyzer.

* * * * *